United States Patent [19]
Hobbensiefken

[11] 4,181,189
[45] Jan. 1, 1980

[54] TAG AXLE FOR SUB-FRAME OF HEAVY DUTY TRUCK POWER MODULE

[76] Inventor: Dean Hobbensiefken, Rte. 1, Box 39, Lyons, Oreg. 97358

[21] Appl. No.: 929,798

[22] Filed: Jul. 31, 1978

[51] Int. Cl.² .......................... B60K 5/00; B62D 61/10
[52] U.S. Cl. ...................................... 180/11; 180/294; 280/81 R
[58] Field of Search ............. 180/11, 22, 24.01, 24.02, 180/64 L, 64 M; 280/81 R, 711

[56] References Cited
U.S. PATENT DOCUMENTS

| | | | |
|---|---|---|---|
| 1,751,871 | 3/1930 | McCulla | 180/22 X |
| 1,861,111 | 5/1932 | Cason | 180/22 X |
| 1,880,842 | 10/1932 | Curtiss | 280/403 X |
| 2,974,976 | 3/1961 | Lyall | 280/405 R |
| 2,982,563 | 5/1961 | Gregg | 280/81 R |
| 3,016,102 | 1/1962 | Anderson et al. | 180/24.01 |
| 3,297,338 | 1/1967 | Underwood | 180/22 X |
| 3,711,112 | 1/1973 | Puckett | 280/81 R |
| 3,732,942 | 5/1973 | Hobbensiefken | 180/11 |
| 3,752,496 | 8/1973 | Meinecke | 180/24.02 X |
| 3,895,818 | 7/1975 | Fearon | 280/81 R |

Primary Examiner—John A. Pekar
Attorney, Agent, or Firm—D. Paul Weaver

[57] ABSTRACT

To increase the load carrying capacity of a truck employing a separable power module having a sub-frame coupled to the main frame of a forward steerable unit and trailing therefrom, a trailing or tag axle assembly has its trailing arms coupled to the sub-frame of the power module through transverse axis non-slip rubber bushings. The tag axle proper is coupled to the rear ends of the trailing arms through longitudinal axis non-slip rubber bushings. The tag axle assembly includes seats for air springs disposed directly over the tag axle and carried by an extension of the main frame of the forward steerable unit. Stresses induced by sharp turning of the vehicle are transmitted to the sub-frame of the power module and not to the main frame of the vehicle resulting in better steerability and less wear and tear on tires and mechanical structures. The increased load carrying capacity of the truck is obtained with a minimal weight increase and with comparatively low cost of manufacturing.

10 Claims, 7 Drawing Figures

FIG. I

FIG. 2
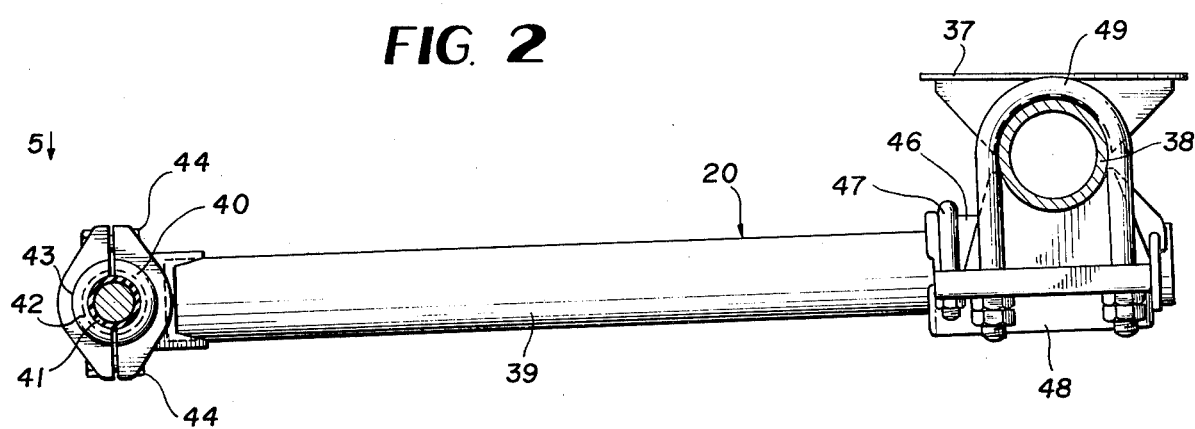
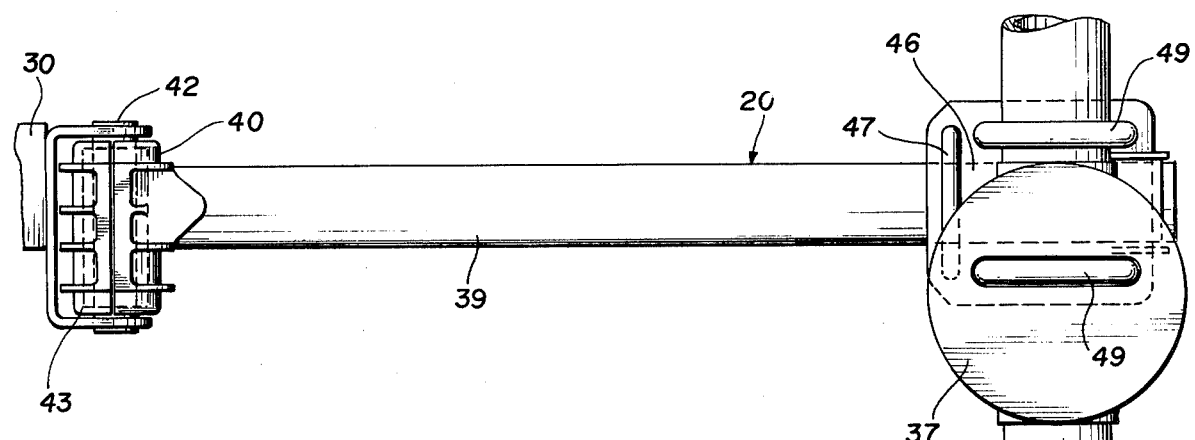
FIG. 3
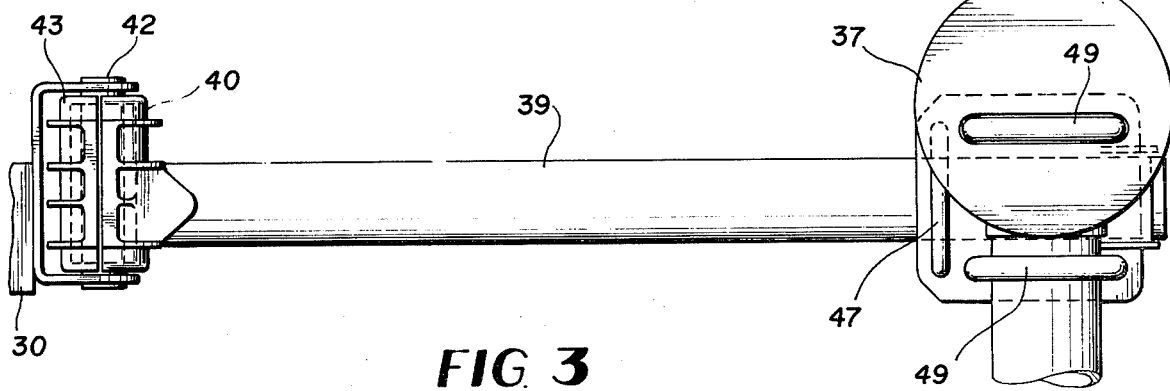

TAG AXLE FOR SUB-FRAME OF HEAVY DUTY TRUCK POWER MODULE

BACKGROUND OF THE INVENTION

The advantages of heavy duty trucks of the type which include a front steerable unit having a driver's cab, a main frame unitized with the front steerable unit, and a trailing power module including a sub-frame detachably coupled at its leading end to the main frame, are considerable in comparison to conventional trucks having fixed power plants and drive axles. Among the advantages are ease of maintenance of the detachable power module and greatly increased flexibility and utility of the vehicle in the overall. Such a vehicle and its advantages are disclosed in prior U.S. Pat. No. 3,732,942, issued to Dean Hobbensiefken on May 15, 1973. Another feature of the vehicle in U.S. Pat. No. 3,732,942 is the use of air springs between the main frame of the front steerable unit and the sub-frame of the trailing separable power module. Air springs have certain known advantages over leaf springs and other customary mechanical suspensions in that they cushion and transmit forces in a vertical direction only and not horizontally to any appreciable degree, either transversely or longitudinally.

The sole objective of this invention is to improve on the utility of that class of truck shown in U.S. Pat. No. 3,732,942 mainly in terms of a significantly increased load carrying capability without a great addition of weight in the vehicle and with comparatively little additional cost. More particularly, the present invention accomplishes its objective by the provision of a tag axle assembly whose trailing arms are connected to the rear end of the sub-frame of the detachable power module. The connection is made through sturdy transverse axis rubber bushings of considerable lengths to transverse axis pivot elements on the sub-frame. The transverse tag axle proper is also connected with the rear of the tag axle trailing arms through long longitudinal axis rubber bushings. As a result of this particular arrangement, stresses induced by sharp turning of the vehicle are not transmitted to the vehicle main frame but instead are transmitted only to the sub-frame of the power module. The same is true of torque stresses created by vehicle braking. Four large rubber bushings of the system have the capability of resisting both types of induced forces and transmitting them only to the power module sub-frame. The tag axle through its trailing arms retains the ability to move up and down with roadway irregularities and this movement is accommodated solely by the yielding or stretching action of the rubber bushings and not by slipping or sliding action which results in wear.

A further notable feature of the invention is the inclusion of an additional pair of vertically compressible air springs on the bottom of the vehicle main frame which is extended rearwardly from the power axle of the power module to the rear of the tag axle assembly or slightly beyond. Seats for these air springs are provided on the top of the tag axle assembly directly over the tag axle which is an advantage over mounting the air springs ahead or rearwardly of the tag axle. A superior ride, stability and vehicle steering control are enhanced in addition to a very significant increase in load carrying capability.

Other features and advantages of the invention will become apparent during the course of following description.

In order to comply with the duty to disclose relevant prior art under 37 C.F.R. 1.56, the following prior United States patents are also made of record herein:
No. 1,751,871; No. 3,016,102; No. 1,861,111; No. 3,297,338; No. 1,880,842; No. 3,711,112; No. 2,974,976; No. 3,752,496; No. 2,982,563; No. 3,895,818.

BRIEF DESCRIPTION OF THE DRAWINGS

FIG. 2 is an enlarged side elevation of the tag axle assembly, partly in section.

FIG. 3 is a plan view thereof.

DETAILED DESCRIPTION

Figure 1:
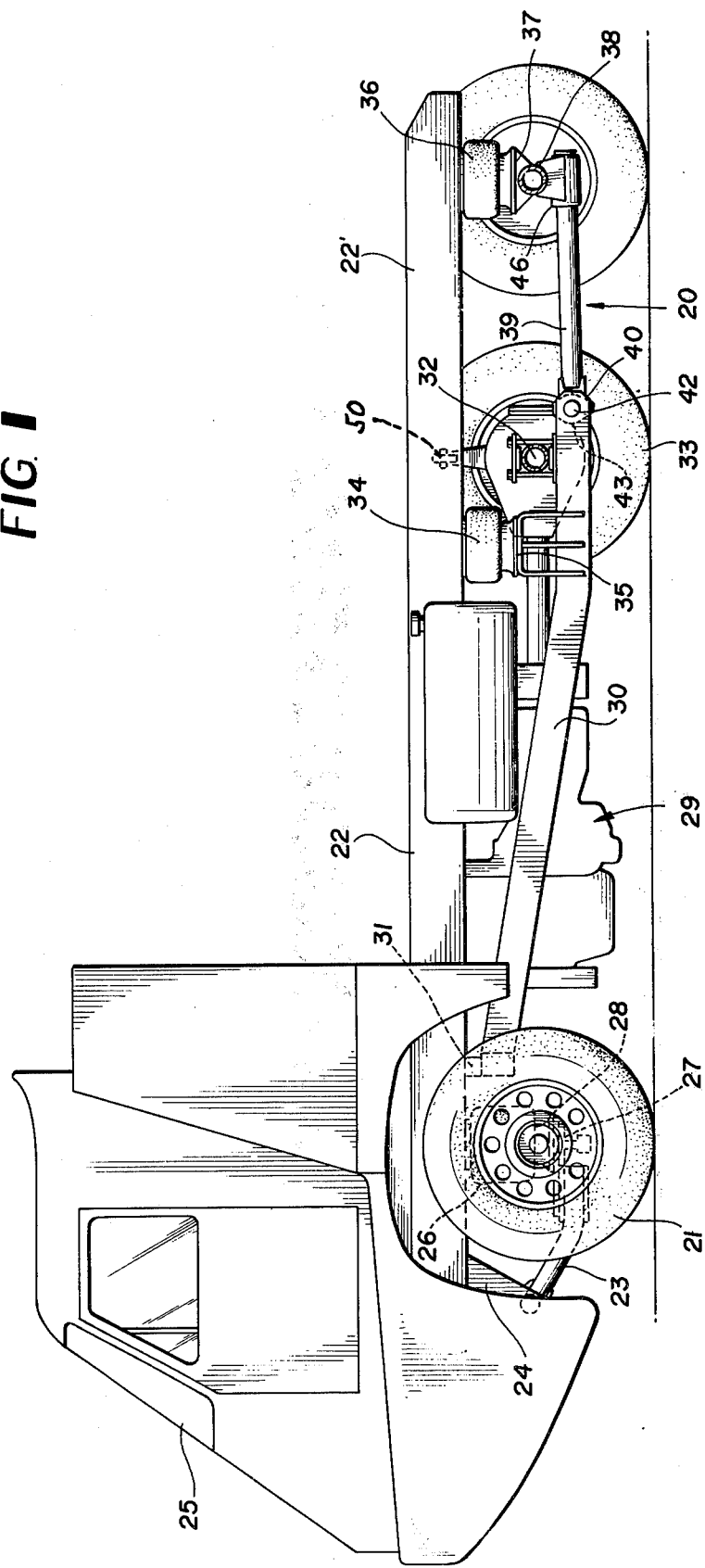
FIG. 1 is a side elevation of a truck including a detachable power module with sub-frame and having the tag axle assembly forming the main subject matter of the invention connected with the sub-frame.
Figure 4:
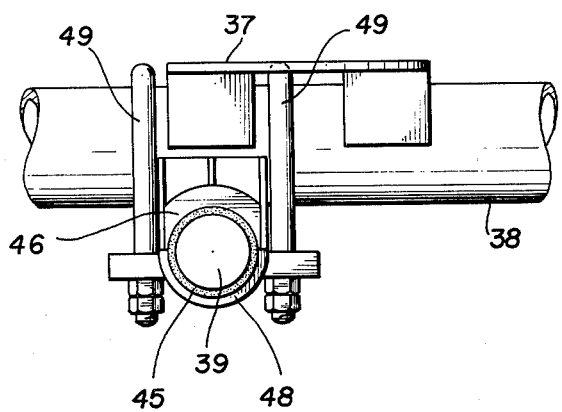
FIG. 4 is a fragmentary rear elevational view of the assembly.
Figure 5:
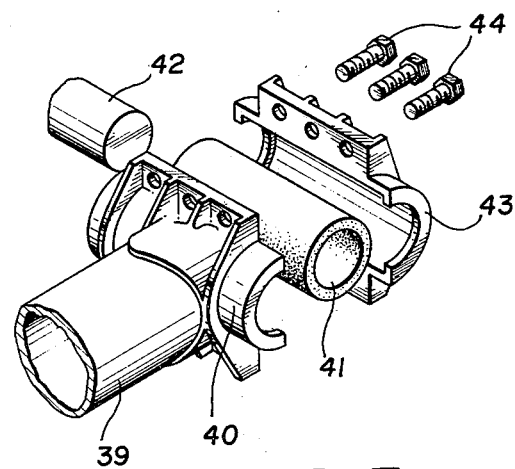
FIG. 5 is an exploded perspective view of a forward transverse axis rubber bushing, cap and seat.

Referring to the drawings in detail, wherein like numerals designate like parts, FIG. 1 illustrates an improved heavy duty truck equipped with the tag axle assembly indicated generally at 20 according to the invention. As previously explained, the purpose of the tag axle assembly is not to provide a mere temporary boost axle for the vehicle which is removed when not needed, but rather to provide a simplified complete suspension for a permanent third axle on the truck behind the power axle which will greatly increase the vehicle load carrying capability over the structure in U.S. Pat. No. 3,732,942. The construction of the tag axle to be described in detail is much lighter and less costly than the constructions of most auxiliary axle arrangements in the prior art.

Referring to FIG. 1, the basic truck disclosed in U.S. Pat. No. 3,732,942 is illustrated with the tag axle assembly 20 connected thereto. The truck comprises a front steerable unit including steerable wheels 21 connected with a horizontal truck main frame 22 through trailing arms 23 connected pivotally at their forward ends to a bolster 24 dependingly secured to the main frame 22 below a cab 25. Air springs 26 of a conventional type are attached to the bottom of the main frame 22 above the transverse axle structure 27 for the steerable wheels 21. A horizontal seating means 28 for the bottoms of the air springs 26 is provided on the axle structure 27.

The basic truck in U.S. Pat. No. 3,732,942 has a detachable power module 29 including a power module sub-frame 30 trailing the front steerable unit, with the forward end of the subframe 30 coupled at 31 to a sturdy transverse member on the main frame 22 somewhat above and rearwardly of the front axle structure 27. The power module 29 further comprises at its rear end a transverse power axle 32 driving traction wheels 33. Additional air springs 34 secured to the bottom of main frame 22 rest on seats 35 provided on the sub-frame 30 just forwardly of the power axle 32. All of this structure thus far described is fully disclosed in U.S. Pat. No. 3,732,942.

With continued reference to FIG. 1, the truck main frame 22 in accordance with the invention is extended rearwardly at 22' so as to overlie the tag axle assembly 20. Additional air springs 36 also dependingly secured to the main frame extension 22' rest on horizontal seats 37 directly above the transverse tag axle 38 forming part of the assembly 20.

Referring to the other drawing figures, the assembly 20 comprises spaced parallel trailing arms 39 equipped at their forward ends with semi-cylindrical seats 40 for transverse axis rubber bushings or sleeves 41 which receive through their bores horizontal transverse axis fixed pivot elements 42, rigidly mounted on the trailing ends of the opposite side arms of subframe 30, FIG. 3. Rigid clamping caps 43 are disposed forwardly of the bushing seats 40 and are firmly secured thereto by bolt means 44 to tightly clamp the rubber bushings 41 on the fixed pivot elements 42 and on their seats 40. The arrangement is such that when the trailing arms 39 rise and fall relative to the sub-frame 30 during operation of the truck, there is no sliding action of the bushings 41 on the pivot elements 42 or within the seats 40, but instead the necessary relative movements are allowed by elastic deformation of the bushings 41. The connection is stable and very resistant to lateral deflection or twisting in any plane because the length of each bushing 41 is about seven inches. The construction forms a vertical articulation joint between the tag axle assembly 20 and the rear of power module subframe 30.

The rear ends of trailing arms 39 are similarly received by rubber bushings 45 approximately ten inches in length, said bushings being received in semi-cylindrical seats 46 immediately beneath the transverse tag axle 38 at right angles thereto. The seats are coupled rigidly beneath the tag axle 38 by strong U-bolts 49. Coacting bushing clamp caps 48 below the bushings 45 are engaged by the U-bolts 47 and are drawn into firm clamping engagement with the bushings 45 to squeeze them around the trailing arms 39 and against their seats. The arrangement is such that there can be no relative sliding between the rubber bushings 45 and the trailing arms 39 and any relative movements developed between these components during the operation of the truck is achieved solely through internal stressing and elastic deformation of the rubber bushings 45 and not by sliding action. This feature is a very significant part of the invention which renders the tag axle assembly strongly resistant to side displacement caused by braking torque or side forces induced by turning the vehicle. Such lateral forces which are developed on the tag axle assembly are eventually transmitted to the power module subframe 30 and not to the main frame 22 of the truck. The total result of the described construction is the provision of a three axle heavy duty truck which is very stable and responsive in its control and steering compared to traditional constructions where side tracking forces transmitted directly to the vehicle main frame tend to decrease its overall lateral stability.

It should be noted that the connections of the two trailing arms 39 in parallel relationship to the transverse tag axle 38 through the rubber bushings 45 will not resist necessary movements of the trailing arms relative to the tag axle as when the vehicle traverses bumps or depressions. The rubber bushings are sufficiently resilient to accommodate these necessary movements.

Stability of the entire three axle vehicle is also enhanced by placing the additional air springs 36 directly over the tag axle 38 instead of offset forwardly or rearwardly thereof. The air springs 34 and 36 are all attached to the bottom of the truck main frame 32 and by nature can resist or transmit only vertical forces, and hence the air springs do not transmit lateral or sway forces between the sub-frame 30 and/or tag axle assembly 20 to the truck main frame. This is another feature of the invention.

The invention as described very significantly increases the load carrying ability of the truck without adding greatly to the weight thereof. No heavy bolster structures are involved in the attachment of the tag axle assembly 20 to the power module sub-frame 30, and in spite of this the entire structure is very strong and stable, as described. It is thought that the arrangement provides a very unique approach to resisting and transmitting suspension forces inherent in truck chassis. While the tag axle assembly 20 is not intended as a temporary booster axle for a vehicle but rather a ready and economical means of adding a permanent third axle to a truck, nevertheless the assembly can be removed where required. The overall construction is economical in comparison to the known prior art and more efficient and reliable in a number of respects.

Figure 6:
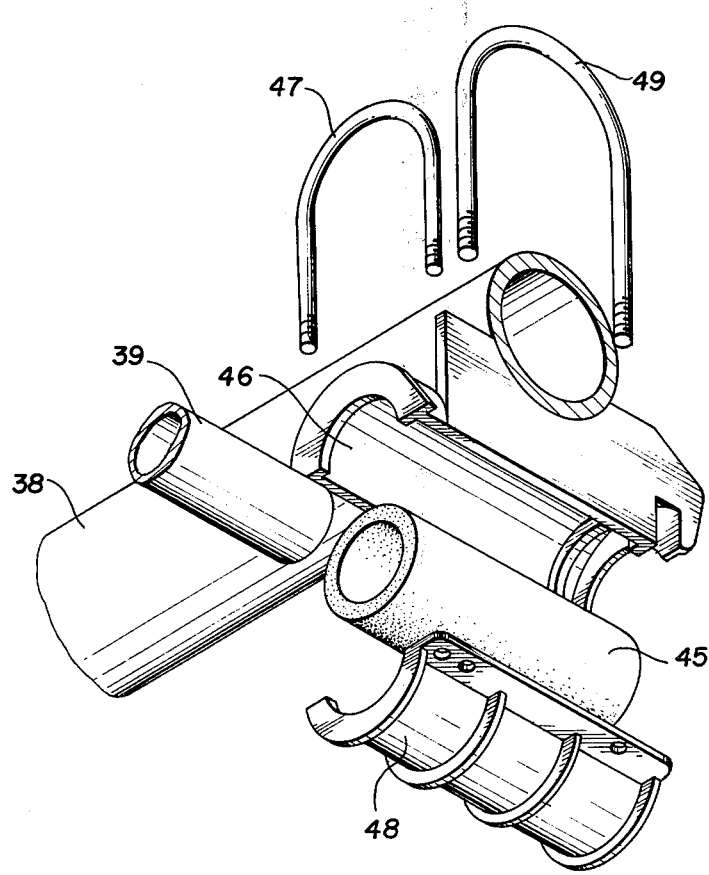
FIG. 6 is a similar exploded perspective view of a rear longitudinal axis rubber bushing, cap and seat.

It should also be noted, in connection with FIGS. 3 and 6, that the connections of the trailing arms 39 with the tag axle 38 are also secured by additional U-bolts 47 disposed forwardly of the axle 38 and spanning the top sides of the seats 46, as illustrated. Other forms of mechanical connections between elements, such as welding, can be employed in some instances.

Figure 7:
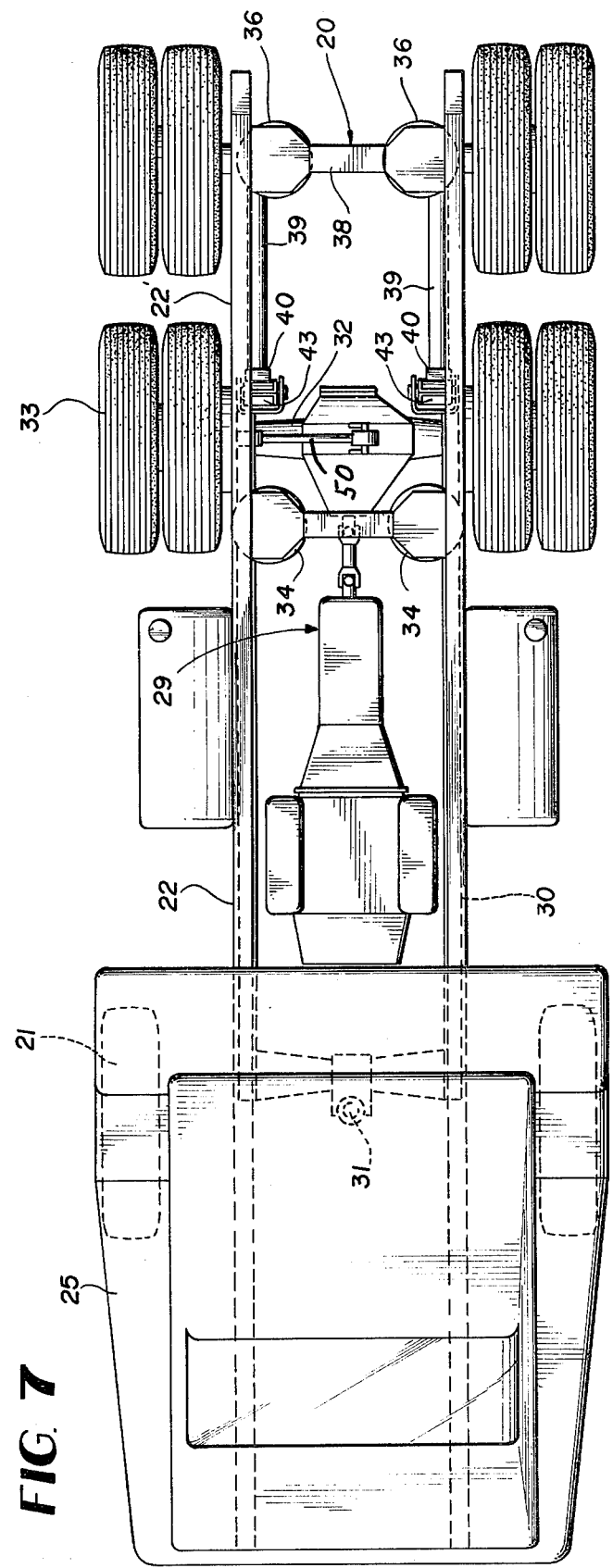
FIG. 7 is a plan view of the complete vehicle shown in FIG. 1.

As disclosed in U.S. Pat. No. 3,732,942, a transverse torque rod 50, FIGS. 1 and 7, interconnects the drive axle housing and right hand main frame side to maintain the power module 29 properly located relative to the main frame 22.

It is to be understood that the form of the invention herewith shown and described is to be taken as a preferred example of the same, and that various changes in the shape, size and arrangement of parts may be resorted to, without departing from the spirit of the invention or scope of the subjoined claims.

I claim:

1. In a truck, a rearwardly extending main frame having a front steerable unit, a separable power module including a sub-frame and a rear power axle having traction wheels underlying the main frame with the sub-frame of the power module coupled in trailing relationship to the front steerable unit, spring means interposed between said main frame and sub-frame near the rear end of the sub-frame, the improvement comprising a tag axle assembly for said truck to increase the load carrying capability thereof, said tag axle assembly comprising a pair of trailing arms pivotally connected to the rear of said sub-frame of the power module on a transverse pivot axis, a tag axle including ground wheels connected with and extending between said trailing arms, a rearward extension of said truck main frame above said trailing arms, and another spring means interposed between the main frame extension and said tag axle assembly.

2. In a truck as defined in claim 1, and both of said spring means comprising air springs attached to opposite side members of said main frame having a front steerable unit dependingly and engaging seat elements carried by said sub-frame and said tag axle assembly, said second-named spring means being disposed directly over said tag axle.

3. In a truck as defined in claim 1, and a pair of transverse axis pivot elements secured to the rear end of the sub-frame on opposite sides thereof, bushings of elastomeric material surrounding said pivot elements, and bushing clamping devices on the forward ends of said trailing arms surrounding said bushings and compressing them to a sufficient degree whereby rising and falling movements of the tag axle assembly are transmitted through said bushings solely by internal stretching of the bushings and without sliding action.

4. In a truck as defined in claim 3, and a pair of longitudinal axis bushings of elastomeric material on rear end portions of said trailing arms, and bushing clamping devices on said tag axle surrounding said longitudinal axis bushings and compressing them to such a degree that rotational forces on the bushings transmitted to them from the tag axle are transmitted through the longitudinal axis bushings solely by internal stretching of the bushings and without sliding action.

5. In a truck as defined in claim 4, and said bushing clamping devices comprising substantially semi-cylindrical rigid bushing seats on the bottom of said tag axle, and coacting substantially semi-cylindrical bushing clamping caps below said seats and bushings of the trailing arms.

6. In a truck as defined in claim 5, and separable fastener means interconnecting said caps and seats.

7. In a truck as defined in claim 4, and said bushings and their clamping devices measuring about ten inches axially along the rear end portions of said trailing arms of said tag axle assembly.

8. In a truck as defined in claim 3, and said bushing clamping devices comprising substantially semi-cylindrical bushing seats on the forward ends of the trailing arms, and coacting substantially semi-cylindrical bushing clamping caps attachable to said seats.

9. In a truck as defined in claim 8, and separable fastener means interconnecting said seats and said caps.

10. In a truck as defined in claim 3, and said bushings and their clamping devices measuring about seven inches in their axial lengths.

* * * * *